(12) United States Patent
Yamada et al.

(10) Patent No.: US 6,931,321 B2
(45) Date of Patent: Aug. 16, 2005

(54) NAVIGATION SYSTEM AND A ROUTE GUIDANCE DATA STORAGE PROGRAM

(75) Inventors: Kunihiro Yamada, Okazaki (JP); Satoshi Ogawa, Okazaki (JP)

(73) Assignee: Aisin Aw Co., Ltd., Anjo (JP)

( * ) Notice: Subject to any disclaimer, the term of this patent is extended or adjusted under 35 U.S.C. 154(b) by 61 days.

(21) Appl. No.: 10/454,615

(22) Filed: Jun. 5, 2003

(65) Prior Publication Data

US 2003/0236617 A1 Dec. 25, 2003

(30) Foreign Application Priority Data

Jun. 14, 2002 (JP) .................................... 2002-174677

(51) Int. Cl.⁷ ............................................. G01C 21/30
(52) U.S. Cl. ..................... 701/213; 701/213; 340/990; 340/995.23
(58) Field of Search ................................. 701/200, 201, 701/202, 204, 208, 209, 210, 213; 340/988, 990, 995.1, 995.13, 995.19, 995.23

(56) References Cited

U.S. PATENT DOCUMENTS

| | | | | |
|---|---|---|---|---|
| 5,774,073 A | * | 6/1998 | Maekawa et al. ...... | 340/995.21 |
| 5,862,509 A | * | 1/1999 | Desai et al. ................. | 701/209 |
| 6,240,364 B1 | * | 5/2001 | Kerner et al. ............... | 701/210 |
| 6,263,277 B1 | * | 7/2001 | Tanimoto et al. ........... | 701/209 |
| 6,298,302 B2 | * | 10/2001 | Walgers et al. ............. | 701/209 |
| 6,587,780 B2 | * | 7/2003 | Trovato ...................... | 701/117 |
| 6,758,608 B2 | * | 7/2004 | Van Arendonk et al. ...... | 385/89 |
| 6,785,608 B1 | * | 8/2004 | Milici et al. ................. | 701/209 |
| 6,795,769 B2 | * | 9/2004 | Kaji et al. ................... | 701/209 |

FOREIGN PATENT DOCUMENTS

| | | |
|---|---|---|
| JP | A 2002-48579 | 2/2002 |
| JP | A 2002-54935 | 2/2002 |
| JP | A 2002-113388 | 4/2002 |
| KR | 1999-0048903 | 7/1999 |
| KR | 2000-0026932 | 5/2000 |

* cited by examiner

*Primary Examiner*—Richard M. Camby
(74) *Attorney, Agent, or Firm*—Oliff & Berridge, PLC

(57) ABSTRACT

A navigation system including a controller that defines a first search criterion concerning travel routes and a second search criterion concerning travel time, searches for a route in accordance with the first search criterion and the second search criterion, and stores route guidance data concerning a searched route onto a storage medium.

18 Claims, 3 Drawing Sheets

NAVIGATION SYSTEM AND A ROUTE GUIDANCE DATA STORAGE PROGRAM

INCORPORATION BY REFERENCE

The disclosure of Japanese Patent Application No. 2002-174677 filed Jun. 14, 2002 including the specification, drawings and claims is incorporated herein by reference in its entirety.

BACKGROUND OF THE INVENTION

1. Field of Invention

The invention relates to a navigation system and a route guidance data storage program.

2. Description of Related Art

There are many kinds of conventional navigation apparatuses, wherein a present position of the vehicle is detected by GPS (Global Positioning System), a vehicle bearing is based on the vehicle's rotational angular speed (traverse angle) measured by a gyrosensor, cartographic data is read from a data storage unit, a map is drawn on a screen in a display unit; and therewith the present position of the vehicle, the vehicle bearing, and an area around the present position of the vehicle are displayed onto the map. The resulting map helps a user of the vehicle to travel along unfamiliar roads.

In the conventional navigation apparatus, selection of the destination and definition of a search criterion triggers route search from the present position to the destination. A searched route is presented to the user in at least one of two ways. It is displayed onto a search route view page on the screen, or outputted vocally from a voice output unit. Such presentation helps the user to travel along the searched route.

Some conventional navigation apparatuses have a communication unit to receive traffic information, including traffic congestion information. The traffic information received by the communication unit can be displayed onto the map.

Other conventional navigation apparatuses can be connected to an information center over communication networks. Such network-connectable navigation apparatus feature the following processes. When the user inputs his or her desired departure point and destination point from his or her personal computer before taking a drive, a route search data file kept in the information center is accessed and, proper route search data is readout from the information center. At the same time, the information center obtains the traffic information from an outside source. Then, the information center carries out a route search that is based on the inputted departure point, the inputted destination point, and the obtained traffic information. Finishing the route search, the information center prepares route guidance data consisting of voice output data, route data that visually represents the searched route or the like. Then, the prepared route guidance data is transmitted to the user's personal computer. In the user's personal computer, the route guidance data is downloaded onto a hard disk.

In the previously-described case of the network-connectable navigation apparatus, the information center is designed to store time-series statistical data derived from past traffic information, especially, past traffic congestion information. This allows the information center to search an optimal route based on not only the present traffic information but also the time-series statistical data.

Further, in the previously-described case of the network-connectable navigation apparatus, the route guidance data downloaded on the hard disk in the personal computer can be copied into, for example, a memory card. When loaded with the memory card, the navigation apparatus reads out the route guidance data from the card and then presents such route guidance data to the user, helping the user to travel along unfamiliar routes.

SUMMARY OF THE INVENTION

There is a problem with the above-described conventional navigation apparatus that uses the route guidance data transmitted from the information center. The route guidance data, prepared based on original scheduled departure time, becomes useless when the departure time is suddenly changed. A sudden change of the departure time, in view of a new travel time that is different from the original scheduled travel time, leads to a user's need for another route search.

Therefore, the problem with the conventional navigation apparatus is that the user is not provided with an optimum route if the route guidance data becomes unworkable due to a sudden change of the departure time.

For solving this problem, the invention provides a new navigation apparatus and a route guidance data storage program, that allows the user to travel the optimum route in accordance with the route guidance data, irrespective of a sudden change of the departure time.

In order to solve the problem, a navigation system according to the invention includes a controller, for example a CPU, that: defines a first search criterion concerning travel routes and a second search criterion concerning travel time, searches for a route in accordance with the first search criterion and the second search criterion, and stores route guidance data concerning a searched route onto a storage medium.

Further, in order to solve the problem, there is provided a method for researching a route, including: defining a first search criterion concerning travel routes; defining a second search criterion concerning travel time; searching for a first route in accordance with the first search criterion and the second search criterion; storing the route guidance data onto the storage medium; re-defining either one or both of the first search criterion and the second search criterion; and searching a second route based on the first search criterion and the second search criterion, either one or both being re-defined, and the route guidance data.

BRIEF DESCRIPTION OF THE DRAWING

Various embodiments of the invention will be described with reference to the drawings, wherein.

DETAILED DESCRIPTION OF PREFERRED EMBODIMENTS

Embodiments according to the present invention will be described hereinafter in detail with reference to the accompanying drawings.

Figure 1:
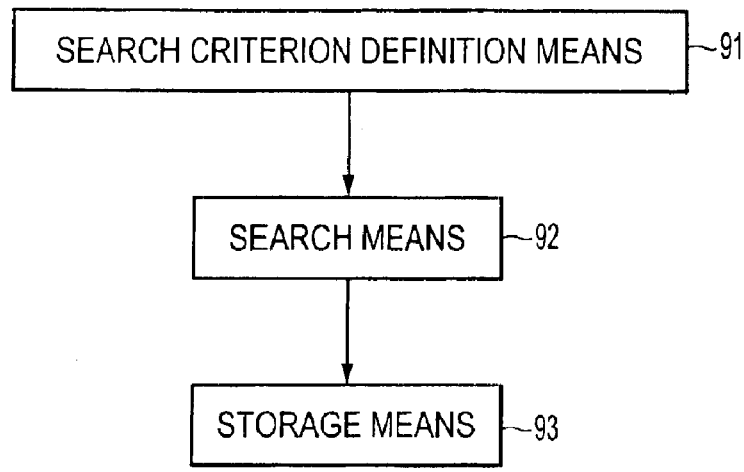
FIG. 1 is a functional block diagram of a navigation apparatus according to an embodiment of the invention.

FIG. 1 is a functional block diagram of a navigation apparatus according to an embodiment of the present invention.

FIG. 1 shows search criterion definition means 91 for defining a first search criterion concerning travel routes and a second search criterion concerning travel time, a search means 92 for searching a route according to the first search criterion and the second search criterion, and a storage means 93 for storing route guidance data concerning a searched route onto a storage medium (not shown).

Figure 2:
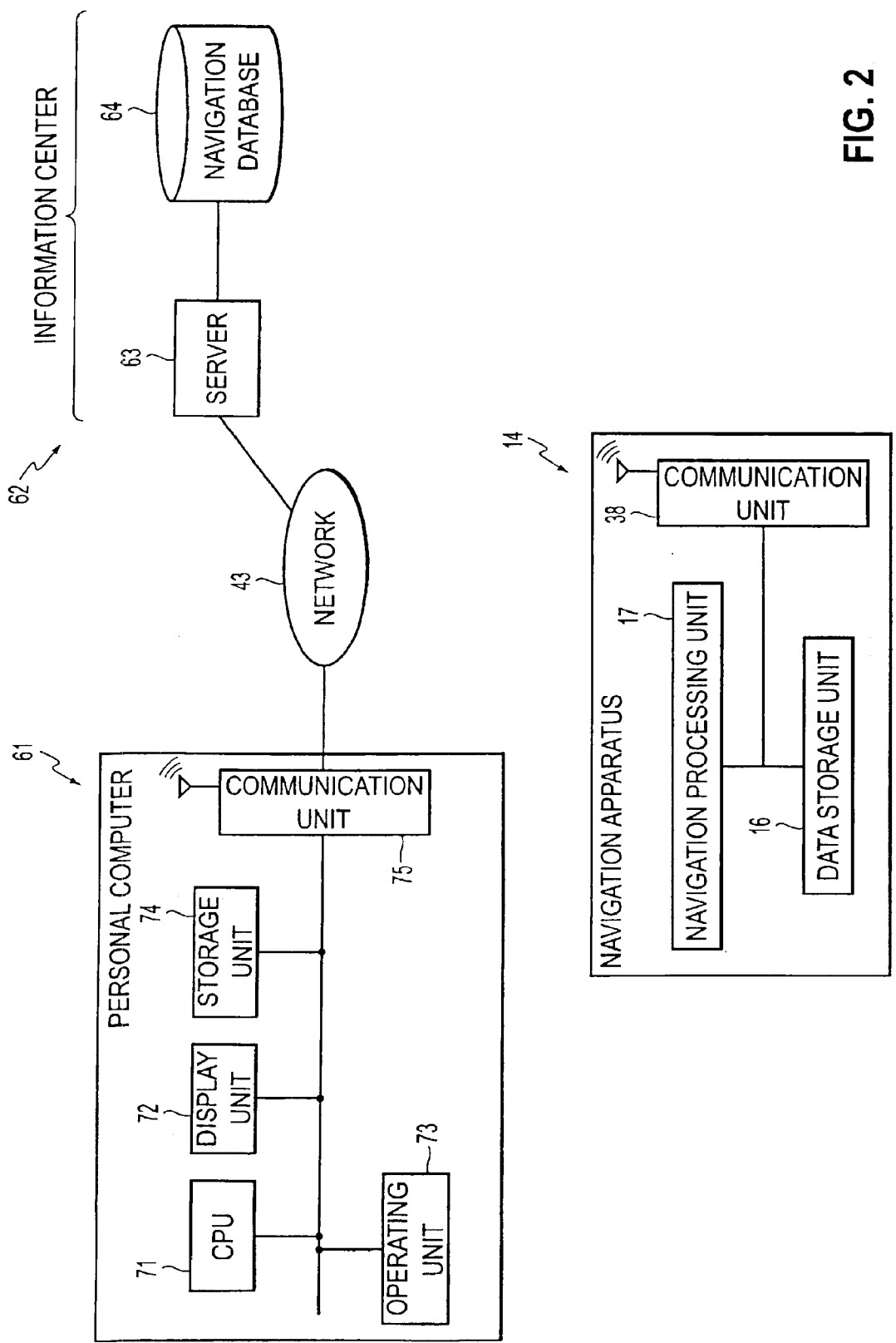
FIG. 2 is a block diagram of a navigation system according to the embodiment of the invention.

FIG. 2 is a block diagram of a navigation system according to the embodiment of the present invention.

FIG. 2 shows a personal computer 61 serving as a user terminal and an information center 62 serving as an information source. The personal computer 61 and the information center 62 are connected with each other over a network 43. In order to provide navigation data, the information center 62 sets up a home page on Web servers that are managed by a certain Internet service provider.

FIG. 2, further shows an on-board navigation apparatus 14 comprising a navigation processing unit 17, a data storage unit 16, and a communication unit 38.

As a whole, the navigation system according to the present invention is comprised of the navigation apparatus 14, the network 43, the personal computer 61, and the information center 62.

The personal computer 61 comprises a CPU 71 serving as an arithmetic-sum-control unit, a display unit 72 serving as an information-notifying unit, an operating unit 73, a storage unit 74, and a communication unit 75. The communication unit 75 includes a modem, or similar device, (not shown) that enables the personal computer 61 to be connected to a server 63 and an access point (not shown) that wirelessly relays data from the personal computer 61 to the communication unit 38 in the navigation apparatus 14.

Although the present invention employs the CPU 71 as the arithmetic-sum-control unit, it is possible use an MPU for the arithmetic-sum-control unit. The display unit 72 may be a CRT, a liquid crystal display, a plasma display, or the like. Although the invention employs the display unit 72 as the information-notifying unit, it is possible to employ a voice output unit that notifies the user of various information as the information-notifying unit.

The operating unit 73 may be a keyboard or a mouse, a touch-sensitive panel in the screen display, a bar code reader, a remote control unit, a joystick, a light pen, a stylus, or any other now known or later-developed input device. If the operating unit 73 is the touch-sensitive panel, all of operation keys, switches, and buttons are arranged on the panel so that input can be done at the touch of them.

The storage unit 74 contains an internal storage device (not shown) such as a RAM, a ROM, a flash memory, or the like. If need be, an external storage device (not shown) may be added to the storage unit 74. The external storage device may be any one of the following: a hard disk, a flexible disk, a magnetic tape, a magnetic drum, a CD-ROM, a CD-R, a MD (Mini Disk), a DVD, a MO (magneto-optical) disk, an IC card, an optical card, a memory card, or any other now known or later developed external storage device (these are not shown). To use the external storage device, the storage unit 74 requires a reading device, that reads data from the external storage device and a writing device, that writes onto the external storage device.

In the present embodiment, the personal computer 61 is employed as the user terminal. However, the user terminal is not limited to the personal computer 61. The user terminal can be any apparatus that is connectable to the network 43, thereby establishing bi-directional communication. The user terminal may be any one of the following apparatuses: an electronic hand-held organizer, a portable telephone, a hand-held information terminal, a PDA (Personal Digital Assistant), a picture phone, a game machine, or any other now known or later developed apparatus capable of establishing bi-directional communication.

The information center 62 comprises the server 63 and a navigation database 64 that is connectable to the server 63. The navigation database 64 contains a cartography-related data file, a search-related data file, and a facility-related data file. The cartography-related data file contains data used for drawing a map. The search-related data file contains search data used for searching a route. The facility-related data file contains facility data concerning various facilities. The cartography-related data file comprises a road data file, an intersection data file, and a node data file. The road data file contains road data concerning respective roads and road links. The intersection data file contains intersection data concerning respective intersections. The node data file contains node data concerning node points located along roads.

The road data comprises sub-data according to the following five factors: road features, road corners, road attributes, road types, and expressways and toll roads. As for the road features, the sub-data concerns width, gradient, cants, banks, road surface conditions, the number of traffic lanes, a point where the number of the traffic lanes is reduced, a point where the width of the road is narrowed, and a point where a railway crossing is located. As for the road corners, the sub-data concerns a curvature radius of the corner, a corner of an intersection, a corner of a T-square intersection, and an entrance to a corner and an exit from a corner. As for the road attributes, the sub-data concerns climbing roads and descending roads. As for the road types, the sub-data concerns national highways, prefectural highways, local minor roads, expressways, urban highways, and toll roads. As for the expressways and toll roads, the sub-data concerns an entrance or exit ramp and a tollgate.

The node data comprises sub-data about road junctions (including intersections and T-square intersections), node point coordinates (positions) located along respective roads at specific intervals according to the curvature radius, node links connecting respective nodes with each other, and height of node points.

The facility data comprises various data about facilities such as hotels, service stations, parking areas, or sightseeing spots. Additionally, the navigation database 64 contains voice output data used for outputting information vocally from the voice output unit (not shown) included in the navigation apparatus 14.

The information center 62 is designed to receive traffic information and other general information such as news or a weather forecast. According to the present embodiment, the traffic information comprises traffic congestion information, traffic regulation information, parking areas information, traffic accidents information, and information about crowdedness of rest areas on expressways. However, other embodiments may include additional information. Both the traffic information and the general information are transmitted to the information center 62 from traffic information providers, for example, VICS (Vehicle Information and Communication System) center (not shown). Once received in the information center 62, the general information and traffic information can be transferred to each personal computer 61 over the network 43 or can be stored into the navigation database 64. In order to store the general information and the traffic information, the database 64 may contain a statistical data file. In the statistical data file, past traffic information and past general information, both of which serve as original statistical data, are stored in chronological order. In addition to the original statistical data, processed statistical data may be stored into the statistical data file. The processed statistical data is such that both the past traffic information and the past general information are processed in a predetermined way. In processing the past traffic information and the past general information, the news and/or the weather forecast are referred to if need be.

The information center 62 may be administered by any of the following: a sole proprietor, a company, a certain organization, local government, a government-affiliated organization, or the like. The navigation data to be distributed is prepared by the center 62 alone or may be purchased from other outside sources.

The network 43 may be any one of the following communication lines: a LAN (Local Area Network), a WAN (Wide Area Network), an intranet, a portable telephone network, a general telephone network, a public switched communication line network, a dedicated communication line network, the Internet, any now known or later developed network, or a certain combined network comprised of various networks. Further, the network 43 may use communication means such as CS (Communication Satellite), BS (Broadcasting Satellite), ground wave digital television broadcasting, FM (Frequency Modulation) multiplex broadcasting, or any now known or later developed network communication means. Furthermore, the network 43 may comprise communication means such as ETC (Electronic Toll Collection) in ITS (Intelligent Transport Systems) or DSRC (Dedicated Short Range Communication). Each of the personal computer 61, the server 63, the Web servers managed by a specified Internet service provider, and the navigation processing unit 17 may work independently from each other as a single computer. In other circumstances, each of them may be combined into a computer that works as a combined computer.

Next, the previously described composition of the navigation apparatus 14 will be described in detail with reference to FIG. 3.

Figure 3:
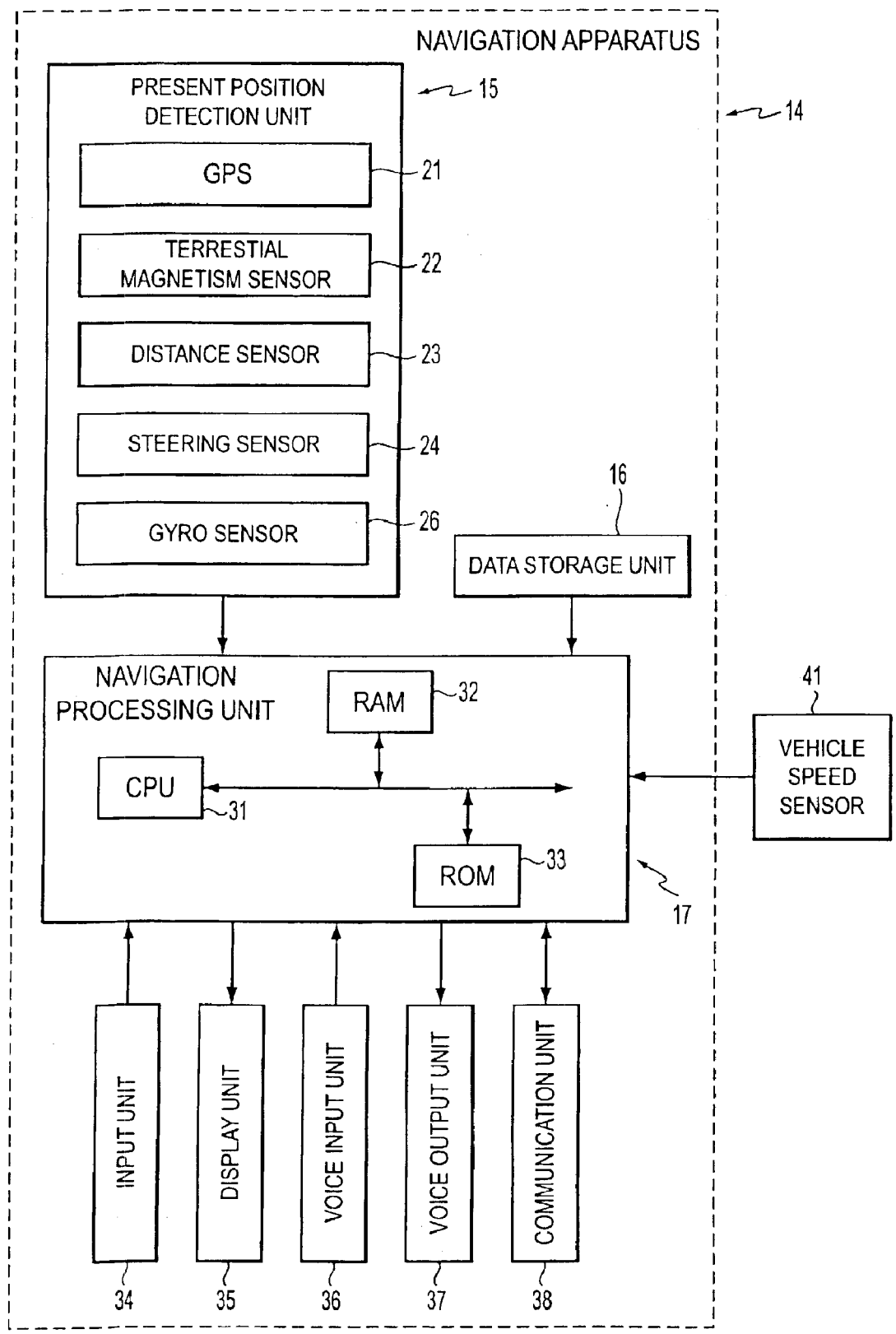
FIG. 3 illustrates composition of the navigation apparatus according to the embodiment of the invention.

FIG. 3 illustrates a composition of the navigation apparatus according to the embodiment of the invention.

FIG. 3, shows a navigation apparatus 14, comprising a present position detection unit 15, by which the present position of the vehicle is detected; a data storage unit 16, in which various data is stored; a navigation processing unit 17, by which arithmetic processing is carried out based on inputted information; an input unit 34, serving as a first operating unit; a display unit 35, serving as a first information-notifying unit; a voice input unit 36, serving as a second operating unit; a voice output unit 37, serving as a second information-notifying unit; and a communication unit 38. A vehicle-speed sensor 41 is coupled to the navigation processing unit 17.

The present position detection unit 15 comprises GPS 21 serving as a present position detecting device, a terrestrial magnetism sensor 22, a distance sensor 23, a steering sensor 24, a gyro sensor 26 serving as a bearing detection device, and an altimeter (not shown).

The GPS 21 detects a present position on the surface of the Earth by receiving radio waves generated by artificial satellites. The terrestrial magnetism sensor 22 detects vehicle bearings by measuring the terrestrial magnetism. The distance sensor 23 detects a distance between two positions on a road. The distance sensor 23 may detect a distance by measuring a rotational frequency of wheels. Furthermore, the sensor 23 may detect a distance by measuring acceleration of the vehicle and integrating twice the measured acceleration. Alternatively, the distance sensor may detect distance by any other now known or later developed method of detecting distance.

The steering sensor 24 detects a steering angle. The steering sensor 24 may be any one of the following sensors fixed to a rotating-part of the wheels: an optical rotational sensor, a rotational resistance sensor, an angle sensor, or the like.

The gyro sensor 26 detects rotational angular speed (traverse angle) of the vehicle by using a gas-rate gyro, a vibrating gyro, or a similar device for detecting rotational angular speed. By integrating the detected rotational angular speed, the vehicle's bearing can be detected.

The present position can be detected by the GPS 21 alone. In other circumstances, the present position may be detected based on a combination of the distance and the vehicle bearing and/or the rotational angular speed detected by the distance sensor 23 and by the terrestrial magnetism sensor 22 and/or the gyro sensor 26 respectively. Furthermore, the present position may be detected based on a combination of the distance and the steering angle detected by the distance sensor 23 and the steering sensor 24 respectively.

The navigation processing unit 17 comprises the following internal storage devices: a CPU 31, serving as an arithmetic-sum-control device; a RAM 32, serving as a working memory in the case where the CPU 31 processes various data; a ROM 33, storing a control program, a program for searching a route to the destination, a program for carrying out route guidance along a route, a program for determining a specific road segment, or the like; and a flash memory (not shown). The input unit 34, the display unit 35, the voice input unit 36, the voice output unit 37, and the communication unit 38 are all coupled to the navigation processing unit 17. A semiconductor memory or the magnetic core may be used for the RAM 32 or the ROM 33. In place of the CPU 31, a MPU may be used as the arithmetic-sum-control device.

The data storage unit 16 is designed to receive a memory card (not shown) serving as a storage medium. Further, the data storage unit 16 has a recording head (not shown) serving as a driver for reading a certain program or data from the memory card and for writing data into the memory card.

According to the present embodiment, the memory card serves as an external storage. However, the external storage is not limited to the memory card. The external storage may be a magnetic disk such as a hard disk, a flexible disk, a magnetic tape, a magnetic drum, a CD, a MD (Mini Disk), a DVD, a MO (magneto-optical) disk, an IC card, an optical card, or any other now known or later developed storage device media.

According to the present embodiment, the ROM 33 and the data storage unit 16 store the programs and the data respectively. However, the invention is not so limited. Both the programs and data may be stored together into a single external storage device. For example, the programs and the data may be read out from the single external storage and then written into the flash memory. Both the programs and the data in the flash memory can be updated by swapping one external storage device for another. If the vehicle is provided with an automatic transmission control device so as to control an automatic transmission (not shown), a program or data for controlling the automatic transmission control device may also prepared and stored in the external storage device.

The input unit 34 comprises operation keys, switches, and/or buttons (all of which are not shown). With the operation of the input unit 34, a present position on departure is calibrated, a departure point and/or destination is inputted, and the communication unit 38 is utilized. The input unit 34 may be a keyboard, a mouse, a bar code reader, a remote control, a joystick, a light pen, a stylus, may take a displayable form on the screen, or may be any other now known or later developed input device. In this case that the input unit takes the displayable form on the screen, the operation keys, switches, and buttons are displayed on the screen so that input can be done at the touch of them.

There is displayed onto the screen in the display unit 35 operation guidance, operation menus, operation keys explanation, a searched route from a present position to the destination, guidance information along the searched route, and FM (Frequency Modulation) multiplex broadcasting programs. The display unit 35 may be a CRT display, a liquid crystal display, plasma display, a hologram device that projects a hologram onto a windshield of the vehicle, or any other now known or later developed display device.

The voice input unit 36, from which necessary information is inputted by voice, comprises a microphone and so on (not shown). The voice output unit 37, which is comprised of a voice synthesizer and a speaker (both not shown), can output synthesized voices from the speaker to the user. The route guidance information or the searched route information is given to the user in the synthesized voices. The speaker can output not only the synthesized voices but also various sounds including any guidance-related information prerecorded on a tape or a memory.

The communication unit 38 comprises a beacon receiver serving as a first receiving means and a FM radio wave receiver serving as a second receiving means. The beacon receiver receives traffic information from roadside radio beacon units and/or optical beacon units (not shown), such as traffic congestion information, traffic regulation information, parking areas information, traffic accidents information, and information about crowdedness of expressway rest areas, all of which are broadcasted from the traffic information provider such as VICS (Vehicle Information and Communication System) center. The FM receiver receives FM multiplex information such as the news or the weather forecast via FM broadcasting stations. If need be, the beacon receiver and the FM receiver can be combined into a single VICS receiver that would be located along the roads. Of course, the FM receiver and the VICS receiver can be used separately from each other.

Furthermore, the communication unit 38 receives various data, for example, D-GPS information to be used in finding an error in detection by the GPS 21. If need be, the communication unit 38 may detect the present position by receiving positional information transmitted from the radio beacon units or the optical beacon units. In this case, the beacon receiver serves as a present position detecting device.

As shown in FIG. 2, the navigation apparatus 14 and the personal computer 61 are connected with each other over a wireless LAN via communication units 38, 75, so that bi-directional communication can be established between them. For this bi-directional communication, the communication unit 75 is provided with the previously-described access point. If the communication unit 38 is provided with PCMCIA/PC card expansion slots for the bi-directional communication, a wireless LAN card (not shown) could be loaded to the communication unit 38. Thereby, according to the present embodiment, the navigation apparatus 14 and the personal computer 61 can be connected with each other via the wireless LAN. However, the invention is not so limited. The apparatus 14 and the computer 61 may be connected with each other over a wired LAN. In this case, a hub is added to the communication unit 75, whereby the communication unit 38 is allowed to be attached and detached to the hub.

In the navigation system with the previously described compositions, the following processes are carried out when the user inputs both a departure point and a destination from the operating unit 73. Upon receipt of the input from the operating unit 73, the search criterion definition means 91 begins a process in which the first search criterion, concerning travel routes, is defined by both the inputted departure point and the inputted destination. Then a second search criterion, concerning travel time, is defined by either desired departure time or desired arrival time. Both of the defined search criteria are transmitted to the information center 62. Although in the foregoing description the first search criterion is defined by the inputted departure point and the inputted destination, the invention is not so limited. The first search criterion may be defined by road types (for example, ordinary road, expressway, toll road) or pass-through points. If need be, additional search criterion concerning, for example, transportation-means may be additionally established. In the case of transportation-means, the additional search criterion is defined by a type of the transportation-means such as, an automobile, a bus, a train, a ship, or an airplane that travels from the departure point to the destination. In addition to the first and second search criterion, any additional search criterion can be transmitted to the information center 62.

If a PDA having PCMCIA/PC card expansion slots and a receivable GPS card is used as the user terminal in place of the personal computer 61, the PDA may set a present position of the vehicle as a departure point.

Upon receipt of the search criterion transmitted from the personal computer 61, an information acquisition means (not shown) in the server 63 begins a process for acquiring the information that is necessary for searching a route. In detail, the information acquisition means accesses the navigation database 64 to read the search data from the search-related data file as well as read the statistical data, derived from the traffic information transmitted from VICS center, from the statistical data file.

After the acquisition of the necessary information, a first search means (not shown) in the server 63 begins a first process for searching a route. Here, the route can be searched according to the first, the second, and any additional criterion, using the traffic information, the original statistical data, and the processed statistical data.

When the first process for searching a route is finished, the guidance data transmission means (not shown) in the server 63 sets search time based on the travel time. Here, the search time during which the route can be re-searched by the navigation apparatus 14 stands for a specified time interval that includes the travel time.

Subsequently, the route guidance transmission means begins a process wherein the following data, serving as the route guidance data, are transmitted to the personal computer 61: route data representing searched routes, time data concerning the search time, cartographic data used for drawing a map that depicts the area around the searched route, and voice output data used for outputting route guidance about the searched route from the voice output unit 37 to the user. The time data contains the statistical data, the processed statistical data, and transportation-means timetable data about public transportation-means.

The route guidance data transmission means calculates the search time including the travel time in various ways. For example, when the second search criterion is defined by the desired departure time, the travel time (the time between the desired departure time and estimated arrival time that is calculated based on the desired departure time) is set by the route guidance data transmission means in the first search process for searching a route. When the second search criterion is defined by the desired arrival time, the travel time (the time between estimated departure time that is calculated based on the desired arrival time and the desired arrival time) is set by the route guidance data transmission means in the first search process for searching a route. If the second search criterion is defined by both the desired departure time and the desired arrival time, the travel time (the time between the desired departure time and the desired arrival time) is set by the route guidance data transmission means. The search time may be obtained by adding a pre-determined time interval, for example one or two hours, before and after the departure and arrival times, respectively.

The route data concerns an attribute, or the like, of each road that composes a searched route. The cartographic data contains mesh information concerning a mesh in which the searched route is included as well as concerning other meshes being adjacent to said mesh. A mesh being a portion of the cartographic data overlayed by horizontal and vertical lines. Both the original statistical data and the processed statistical data concern roads or points contained in the cartographic data that represents a map of the area around the searched route.

The public transportation-means timetable data contains bus timetable data, train timetable data, ship timetable data, airplane timetable data, and timetable data for other now known or later developed forms of public transportation. Each of these timetable data includes identification numbers of boarding platforms, transportation service numbers, and departure and arrival time. Here, the boarding platforms are such as bus stops, railroad stations, harbors, and airports, all of which are contained in the cartographic data that represents the area around the searched route. The public transportation service numbers are such as bus-service numbers, train-service numbers, ship-service numbers, and flight-service numbers. The departure and arrival time concerns the time when the public transportation-means departs from and arrives at the boarding platforms during the search time.

According to the present embodiment, the voice output data is transmitted from the information center 62 to the personal computer 61. However, the invention is not so limited. As for the voice output data, it can be originally stored in the data storage unit 16 in the navigation apparatus 14. In this case, there is no need to transmit the voice output data, serving as part or all of the route guidance data, from the information center 62 to the computer 61.

Upon receipt of the route guidance data, the storage means 93 in the CPU 71 begins a process for storing the route guidance data. Then, the stored route guidance data is downloaded to a hard disk in the storage unit 74.

As far as the user's vehicle is parked near his or her personal computer, e.g., at or near the user's house, the downloaded route guidance data stored in the hard disk can be transmitted to the navigation apparatus 14 aboard the vehicle. The data transmission is launched with the user's operation of the operating unit 73. The route guidance data transmitted to the navigation apparatus 14 is stored into the flash memory in the navigation processing unit 17 (not shown).

Figure 4:
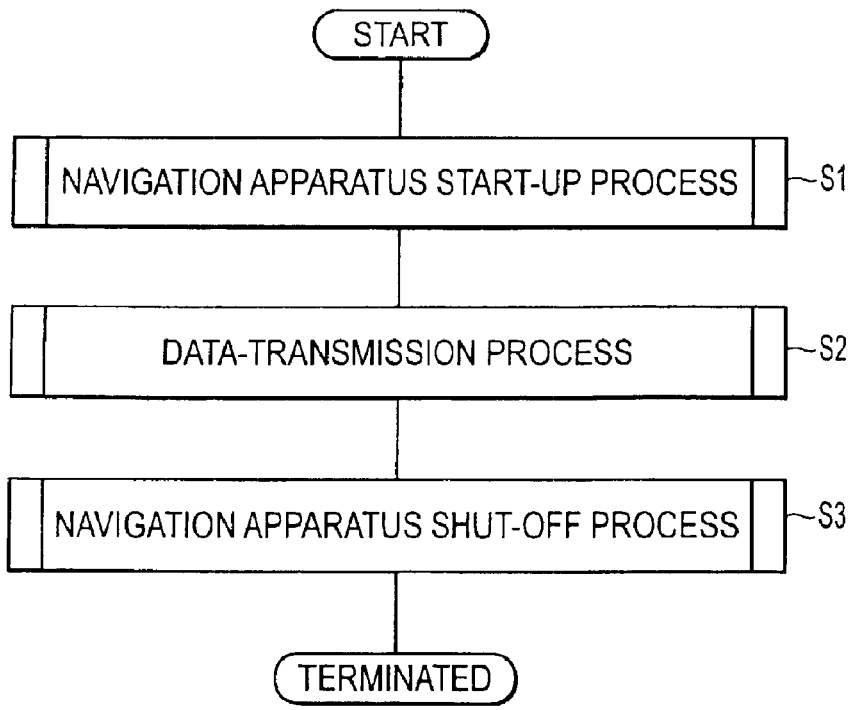
FIG. 4 is a main flowchart showing working of a personal computer according to the embodiment of the present invention.

FIG. 4 is a flowchart showing the working of a personal computer according to the present embodiment of the invention.

As shown in step S1, when the user operates the operating unit 73 (shown in FIG. 2) to start up the navigation apparatus 14, a navigation apparatus start-up means (not shown) in the CPU 71 begins a process for starting up the navigation apparatus, and thereby the power (not shown) of the apparatus 14 is turned on. Then, in step S2 the data transmission means (not shown) in the CPU 71 carries out the data transmission process wherein the route guidance data is read out from the hard disk in the storage unit 74 and transmitted to the navigation apparatus 14. Along with this data transmission, the CPU 31 in the route guidance data storage means begins the process for storing the route guidance data into the flash memory.

After storing all the route guidance data into the flash memory, in step S3, a navigation apparatus shut-off means (not shown) in the CPU 71 begins a process for shutting off the apparatus 14. Being shut off, the navigation apparatus 14 switches into a standby state in which the route guidance data is accessible by the user at any time.

Hereinafter, working of the navigation apparatus 14 will be described.

When an ignition (not shown) of the vehicle is turned on, the navigation apparatus 14 is automatically started. Then, the present position of the vehicle is detected by the GPS 21 and the vehicle bearing is detected based on the traverse angle measured by the gyro sensor 26.

Subsequently, the route guidance means (not shown) in the CPU 31 begins the process of route guidance, wherein the route guidance data is read from the flash memory in order to display a map view onto the screen in the display unit 35. The present position of the vehicle, a map of the area around the vehicle, the vehicle bearing, and the searched route from the departure point to the destination are displayed onto the map view. Together with the map view, the user is provided with the route guidance by voice outputted from the voice output unit.

The map view shows the present position of the vehicle, the map depicting the area around the vehicle, the vehicle bearing, and the searched route, thereby helping the user to travel along the searched route.

Sometimes, there occurs a situation where original scheduled departure time is suddenly changed and the user is forced to travel the searched route during a travel time different from the original scheduled travel time. When the user finds that the situation worsens due to, for example, a traffic jam on the searched route, he or she would be forced to operate the input unit 34 so as to redefine each of the first, second, and/or additional search criterion.

The search means 92 as shown in FIG. 1 comprises first route search means and second route search means. Upon redefinition of the search criterion, the second route search means in the search means 92 provided in the CPU 31 carries out a second route search process wherein the route guidance data is read out from the flash memory and a route is searched according to the first, second, and/or additional route search criterion. Thus, the route is searched based on the route guidance data and presented to the user. This is how the user can travel along a searched optimum route in accordance with the route guidance data.

Using the navigation apparatus having previously described composition, there is no need to interrogate the information center 62 about new route guidance data when the user wants to re-search another route. This leads to the reduction of the time for the route search.

According to the present embodiment, the route guidance data downloaded to the hard disk in the storage unit 74 can be transmitted to the navigation apparatus 14. However, the present invention is not limited to such a case. For example, the route guidance data may be copied into the memory card that could be loaded to the navigation apparatus 14. The route guidance data upon which the user depends on to travel the searched route is not limited to the hard-disk-stored route guidance data, but can be the memory-card-stored route guidance data.

Sometimes, there occurs a situation where the user has to travel a specified portion of the searched route by means such as bus, train, ship, or airplane. Such a situation sometimes adversely affects travel time because of the change of the time of arrival at the bus stop, the railroad station, the harbor, or the airport due to sudden traffic jam. In this situation, the user will be forced to use another bus, train, ship, or airplane during another travel time that is different from the original scheduled travel time. If the user is challenged by such inconvenience, he or she would be required to operate the input unit 34 to redefine the first, second, and/or additional search criterion. Such redefinition is made possible because the route guidance data, in the flash memory (not shown) in the navigation processing unit 17 of the navigation apparatus 14, contains the transportation-means timetable data according to the present embodiment.

Upon redefining each of the search criteria, the second route search means starts to read out the route guidance data from the flash memory. Then, according to each of the redefined first, second, and/or additional route search criterion, another route can be researched based on the route guidance data and then given to the user. This is how the user can travel a specified portion of the searched route by bus, train, ship, or airplane in accordance with the route guidance data.

The foregoing invention has been described in terms of preferred embodiments. However, those skilled in the art will recognize that many variations of such embodiments exist. Such variations are intended to be within the scope of the present invention and the appended claims.

What is claimed is:

1. A navigation apparatus, comprising:
   a storage medium; and
   a controller that:
   defines a first search criterion concerning positional information of travel routes and a second search criterion concerning travel time, the travel time comprising at least one of a desired departure time and a desired arrival time;
   searches for a route and route guidance data in accordance with the first search criterion and the second search criterion, the route and route guidance data searched based on navigation data stored outside the navigation apparatus; and
   stores the route and route guidance data onto the storage medium;
   wherein the route guidance data is less than all of the navigation data, and only includes route data concerning searched routes and time data within a predetermined guide time period such that a route may be re-searched based on the route guidance data at any time within the predetermined guide time period, the predetermined guide time period defined by at least one of the desired departure time and the desired arrival time.

2. The navigation apparatus according to claim 1, wherein the controller provides a user with route guidance derived from the route guidance data.

3. The navigation apparatus according to claim 1, wherein the time data contains statistical data that is derived from traffic information.

4. The navigation apparatus according to claim 1, wherein the time data contains transportation timetable data.

5. A method for re-searching a route, comprising:
   defining a first search criterion concerning positional information of travel routes;
   defining a second search criterion concerning travel time, the travel time comprising at least one of a desired departure time and a desired arrival time;
   searching for a first route and route guidance data in accordance with the first search criterion and the second search criterion, the first route and route guidance data searched based on navigation data stored outside a navigation apparatus;
   storing the route guidance data onto a storage medium inside the navigation apparatus;
   re-defining at least one of the first search criterion and the second search criterion; and
   searching a second route based on the first search criterion and the second search criterion using the route guidance data, at least one of the first search criterion and the second search criterion being re-defined;
   wherein the route guidance data is less than all of the navigation data, and only includes route data concerning searched routes and time data within a predetermined guide time period such that the second route may be searched based on the route guidance data at any time within the predetermined guide time period, the predetermined guide time period defined by at least one of the desired departure time and the desired arrival time.

6. The method for re-searching the route according to claim 5, wherein updated route guidance data is automatically stored in the navigation apparatus whenever the navigation apparatus is within a wireless transmission range.

7. The method for re-searching the route according to claim 5, wherein the route guidance data is updated by replacing a removable storage medium containing the route guidance data.

8. A route guidance data storage program, comprising:
   a routine that defines a first search criterion concerning positional information of travel routes and a second search criterion concerning travel time, the travel time comprising at least one of a desired departure time and a desired arrival time;
   a routine that searches for a route and route guidance data according to the first search criterion and the second search criterion, the route and route guidance data searched based on navigation data stored outside a navigation apparatus; and
   a routine that stores the route and route guidance data onto a storage medium inside the navigation apparatus;
   wherein the route guidance data is less than all of the navigation data, and only includes route data concerning searched routes and time data within a predetermined guide time period such that a route may be re-searched based on the route guidance data at any time within the predetermined guide time period, the predetermined guide time period defined by at least one of the desired departure time and the desired arrival time.

9. A program embedded in a recording medium or dedicated circuit, comprising:
- a subroutine that defines a first search criterion concerning positional information of travel routes;
- a subroutine that defines a second search criterion concerning travel time, the travel time comprising at least one of a desired departure time and a desired arrival time;
- a subroutine that searches a route and route guidance data according to the first search criterion and the second search criterion, the route and route guidance data searched based on navigation data stored outside a navigation apparatus; and
- a subroutine that stores the route and route guidance data onto a storage medium inside the navigation aparatus;
- wherein the route guidance data is less than all of the navigation data, and only includes route data concerning searched routes and time data within a predetermined guide time period such that a route may be re-searched based on the route guidance data at any time within the predetermined guide time period, the predetermined guide time period defined by at least one of the desired departure time and the desired arrival time.

10. The program according to claim 9, further comprising:
- a subroutine that redefines either one or both of the first search criterion and the second search criterion; and
- a subroutine that re-searches a route based on the redefined either one or both of the first search criterion and the second search criterion and the route guidance data stored on the storage medium.

11. A navigation system, comprising:
- a storage medium; and
- a controller that:
  - defines a first search criterion concerning positional information of travel routes and a second search criterion concerning travel time, the travel time comprising at least one of a desired departure time and a desired arrival time;
  - transmits the first search criterion and the second search criterion to an information center outside the navigation system, which searches for a route and route guidance data in accordance with the first search criterion and the second search criterion;
  - receives the route and the route guidance data from the information center; and
  - stores the route and the route guidance data concerning the searched route onto the storage medium;
- wherein the route guidance data is less than all of the navigation data, and only includes route data concerning searched routes and time data within a predetermined guide time period such that a route may be re-searched based on the route guidance data at any time within the predetermined guide time period, the predetermined guide time period defined by at least one of the desired departure time and the desired arrival time.

12. A navigation apparatus comprising the navigation system of claim 11.

13. The navigation apparatus of claim 1, wherein the predetermined guide period is defined as a the time period beginning at the desired departure time and ending a predetermined time interval after the desired departure time.

14. The navigation apparatus of claim 1, wherein the predetermined guide period is defined as a the time period ending at the desired arrival time and beginning a predetermined time interval before the desired arrival time.

15. The navigation method of claim 5, wherein the predetermined guide period is defined as a the time period beginning at the desired departure time and ending a predetermined time interval after the desired departure time.

16. The navigation method of claim 5, wherein the predetermined guide period is defined as a the time period ending at the desired arrival time and beginning a predetermined time interval before the desired arrival time.

17. The navigation system of claim 11, wherein the predetermined guide period is defined as a the time period beginning at the desired departure time and ending a predetermined time interval after the desired departure time.

18. The navigation system of claim 11, wherein the predetermined guide period is defined as a the time period ending at the desired arrival time and beginning a predetermined time interval before the desired arrival time.

* * * * *